(12) United States Patent
Ramsay, III et al.

(10) Patent No.: US 6,888,550 B2
(45) Date of Patent: May 3, 2005

(54) SELECTING BETWEEN DOUBLE BUFFERED STEREO AND SINGLE BUFFERED STEREO IN A WINDOWING SYSTEM

(75) Inventors: George F. Ramsay, III, Cedar Park, TX (US); Jeanne K. Sparlin, Taylor, TX (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 09/909,235

(22) Filed: Jul. 19, 2001

(65) Prior Publication Data

US 2003/0016225 A1 Jan. 23, 2003

(51) Int. Cl.⁷ ............................ G09G 5/399; G06F 12/02
(52) U.S. Cl. ........................ 345/543; 345/552; 345/539
(58) Field of Search ............................... 345/501–506, 345/519–520, 522, 530–574

(56) References Cited

U.S. PATENT DOCUMENTS

| | | | | |
|---|---|---|---|---|
| 5,119,494 A | * | 6/1992 | Garman | 711/202 |
| 5,289,574 A | * | 2/1994 | Sawyer | 345/759 |
| 5,515,494 A | | 5/1996 | Lentz | 395/157 |
| 5,603,034 A | * | 2/1997 | Swanson | 717/111 |
| 5,664,139 A | * | 9/1997 | Spurlock | 711/202 |
| 5,760,792 A | | 6/1998 | Holt et al. | 345/509 |
| 5,794,037 A | | 8/1998 | Young | 395/678 |
| 5,801,705 A | * | 9/1998 | Kato et al. | 345/419 |
| 5,801,714 A | | 9/1998 | Holt | 345/501 |
| 5,831,637 A | | 11/1998 | Young et al. | 345/501 |
| 5,831,638 A | * | 11/1998 | West et al. | 345/539 |
| 5,864,512 A | | 1/1999 | Buckelew et al. | 365/230.01 |
| 6,020,901 A | * | 2/2000 | Lavelle et al. | 345/509 |
| 6,038,034 A | * | 3/2000 | Nishio et al. | 358/404 |

FOREIGN PATENT DOCUMENTS

WO wo 97/06523 * 2/1997 ............ G09G/1/16

OTHER PUBLICATIONS

"Double buffering technique for binocular imaging in a window", by McVeigh et al, SPIE–The international Society for optical engineering, Feb. 7–9, 1995, pp. 168–175.*

* cited by examiner

Primary Examiner—Kee M. Tung
(74) Attorney, Agent, or Firm—Robert A. Voigt, Jr.; Winstead Sechrest & Minick P.C.; Diana L. Roberts-Gerhardt

(57) ABSTRACT

A method, computer program product and system for allocating the memory space in a frame buffer. A Device Dependent Layer (DDX) of an X-server may read command line options or alternatively an option selected by a user. If the command line options or alternatively the user selectable option indicates to allocate the memory space in the frame buffer to support a particular type of stereo, e.g., double buffered stereo, single buffered stereo, then the DDX may allocate the memory space in the frame buffer accordingly. If the memory space of the frame buffer is allocated for single buffered stereo, then the extra memory space in the frame buffer from not supporting double buffered stereo may be allocated for texture and/or off screen caching.

36 Claims, 5 Drawing Sheets

SELECTING BETWEEN DOUBLE BUFFERED STEREO AND SINGLE BUFFERED STEREO IN A WINDOWING SYSTEM

TECHNICAL FIELD

The present invention relates to graphics windowing systems, and more particularly to allocating memory space in a frame buffer for either double buffered stereo or single buffered stereo in a windowing system, e.g., X-window system.

BACKGROUND INFORMATION

The X-window system is a standard for the implementation of network-based window systems such as Unix™ or AIX™ window systems. The X-window system provides users and developers with the functionality for creating and managing a window environment in a network-based computer system.

Typically, an X-window system may comprise a graphics adapter configured to control the rendering of text and images on a display. The graphics adapter may comprise what is commonly referred to as a frame buffer. A frame buffer may be an area of memory used to hold one or more frames of data to be displayed onto the user's display screen. When the data is displayed on the user's display screen, the user may see a two-dimensional image. In some implementations, a user may be able to view the two-dimensional image as a three-dimensional image using a process commonly referred to as "stereo."

A definition of "stereo" is deemed appropriate. Stereo may refer to stereoscopy which is a particular way a user may view a two-dimensional image on the user's display screen as a three-dimensional image. The two-dimensional image on the user's display screen may comprise two slightly different images with different perspectives that are displayed alternately at a high speed. One image may be for the left eye to view and the other image may be for the right eye to view. When the user wears liquid-crystal shutter eyeglasses which are adapted to block light directed onto each of the right and left eyes alternately in synchronization with the alternate display of the images for the right and left eyes, the viewer may perceive three dimensional image.

The images for the right and left eyes may be temporarily stored in buffers in the frame buffer prior to being displayed on the user's display screen. The frame buffer may be organized in a manner commonly referred to as double buffering. Double buffering may refer to the frame buffer comprising four buffers where the buffers alternate for being used to render or display images. Typically, two buffers are temporarily used for rendering images; whereas, the other two buffers are temporarily used for displaying images. When the images are rendered, the two buffers that were previously used for rendering images alternatively become buffers for displaying images. When that occurs, the two buffers that were used for displaying images alternatively become used for rendering images. One of the two buffers used for rendering/displaying an image may be use for rendering/displaying a right eye image. The other of the two buffers used for rendering/displaying an image may be used for rendering/displaying a left eye image. By having the frame buffer organized with double buffering a problem commonly referred to as tearing may be prevented. Tearing may refer to the problem of an image with missing portions. Organizing the frame buffer with double buffering storing images for the right and left eyes is commonly referred to as "double buffered stereo."

However, by having the frame buffer organized with double buffering, the frame buffer has less memory space for texture and/or off screen caching. Typically, a frame buffer may allocate a portion of its memory space for storing texture maps. A texture map may refer to the two dimensional image that is mapped onto a surface of a three-dimensional object. Furthermore, a frame buffer may allocate a portion of its memory space for off screen caching. Off screen caching may refer to storing an image that has already been rendered thereby permitting the display of that image at a later time without having to first render that image. By not having to first render the image, the image may be displayed at a faster rate.

If the frame buffer were organized with only two buffers, commonly referred to as single buffering, instead of four buffers for rendering and displaying images for the right and left eyes, the frame buffer may have more memory space to allocate for texture and/or off screen caching. One of the two buffers may be used for rendering/displaying images for the right eye and the other of the two buffers may be used for rendering/displaying images for the left eye. Organizing the frame buffer with single buffering storing images for the right and left eyes is commonly referred to as "single buffered stereo."

It would therefore be desirable to provide the user of a client with an option to select single buffered stereo instead of double buffered stereo in a windowing system, e.g., X-window system, thereby permitting the extra memory space in the frame buffer to be allocated for texture and/or off screen caching.

SUMMARY

The problems outlined above may at least in part be solved in some embodiments by a user entering a command line option, e.g., "-Stereo", that indicates to allocate the memory space in a frame buffer to support a particular type of stereo, e.g., double buffered stereo. If the command line option is not entered by the user then the memory space in the frame buffer may be allocated according to a default, e.g., single buffered stereo. When the memory space in the frame buffer is allocated to support single buffered stereo then the frame buffer has more memory space to allocate for texture memory and/or off-screen cache.

In one embodiment, a method for allocating memory space in a frame buffer may comprise the step of a Device Dependent Layer (DDX) of an X-server reading command line options. If the command line options include the command line option that indicates to the DDX to allocate the memory space in the frame buffer to support a particular type of stereo, e.g., double buffered stereo, then the DDX may allocate the memory space in the frame buffer accordingly. If the command line options do not include the command line option that indicates to the DDX to allocate the memory space in the frame buffer to support a particular type of stereo, then the DDX may allocate the memory space in the frame buffer according to a default, e.g., single buffered stereo. If the memory space of the frame buffer is allocated for single buffered stereo instead of double buffered stereo, then the extra memory space in the frame buffer from not supporting double buffered stereo may be allocated for texture and/or off screen caching.

In one embodiment, a method for allocating memory space in a frame buffer may comprise the step of providing the user a selectable option to allocate the memory space in the frame buffer as a double buffered stereo or a single buffered stereo. DDX of an X-server may then read the selected option. If the selected option indicates to the DDX to allocate the memory space in the frame buffer to support double buffered stereo, then the DDX may allocate the memory space in the frame buffer accordingly. If the selected option indicates to the DDX to allocate the memory space in the frame buffer to support single buffered stereo, then the DDX may allocate the memory space in the frame buffer accordingly. If the memory space of the frame buffer is allocated for single buffered stereo instead of double buffered stereo, then the extra memory space in the frame buffer from not supporting double buffered stereo may be allocated for texture and/or off screen caching.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
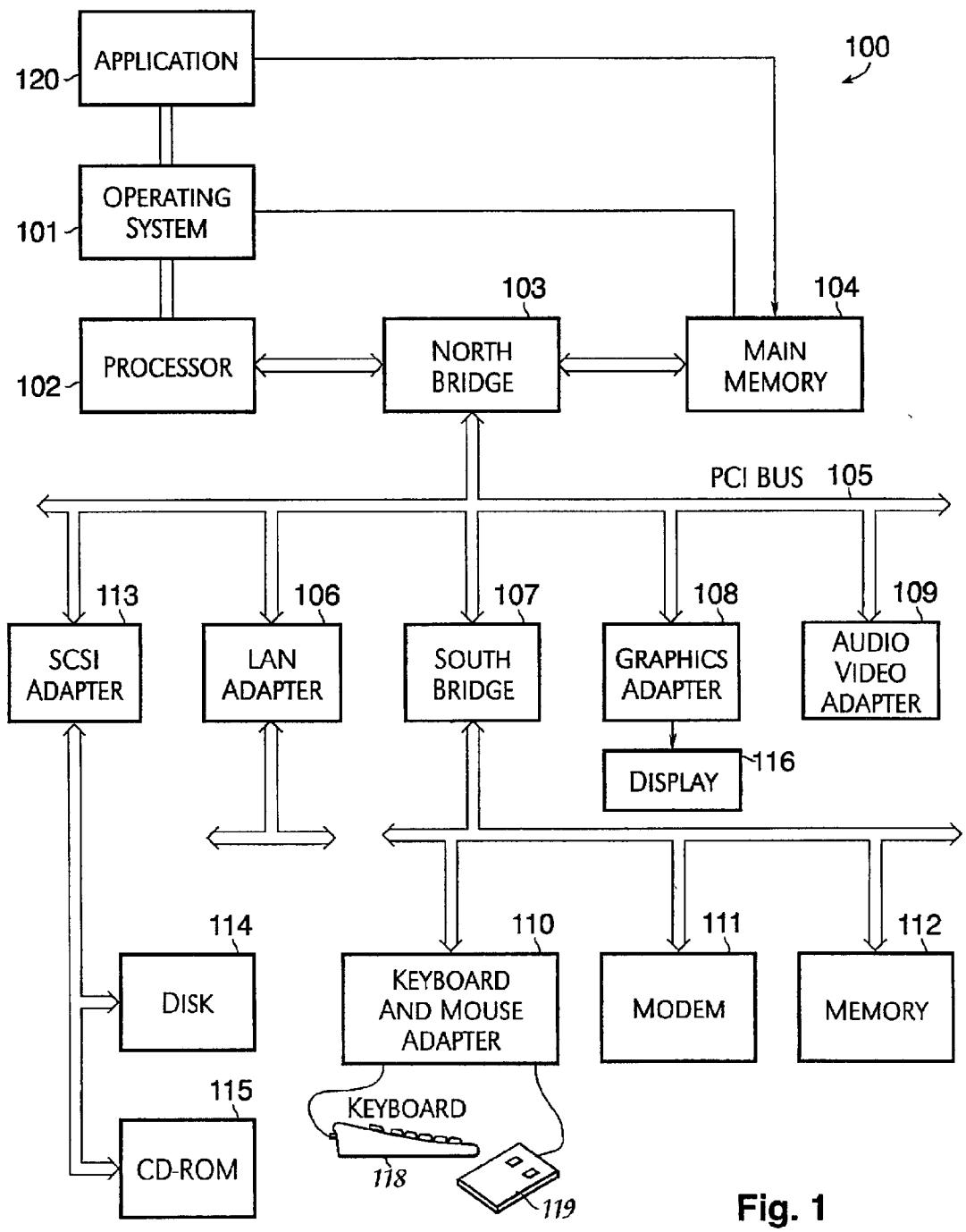
FIG. 1 illustrates an embodiment of a data processing system configured in accordance with the present invention.

FIG. 1—Computer System

FIG. 1 illustrates a typical hardware configuration of a data processing unit 100 which is representative of a hardware environment for practicing the present invention. Data processing unit 100 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104, e.g., Dynamic Random Access Memory (DRAM), Synchronous DRAM (SDRAM), may be connected to PCI local bus 105 through north bridge 103. North bridge 103 may also include an integrated memory controller and cache memory for processor 102. Furthermore, an operating system 101, e.g., AIX, UNIX, may run on processor 102 to provide control and coordinate the functions of the various components of FIG. 1. Application 120, e.g., X-Server configured to allocate memory space within a frame buffer as described in FIGS. 4 and 5, runs in conjunction with operating system 101 which implements the various functions to be performed by application 120. A more detailed description of X-server is disclosed in FIG. 3. It should be noted that software components including operating system 101 and application 120 may be loaded into system's main memory 104. Additional components coupled to PCI bus 105 may be made through direct component interconnection or through add-in boards. In the depicted example, Local Area Network (LAN) adapter 106, Small Computer System Interface (SCSI) host bus adapter 113, and south bridge 107 are connected to PCI local bus 105 by direct component connection. In contrast, audio/video adapter 109, graphics adapter 108 are connected to PCI local bus 105 by add-in boards inserted into expansion slots. The processes of the present invention may be used to manage rendering of data by graphics adapter 108 or audio/video adapter 109. Graphics adapter 108 may be provided to control the rendering of text and images on a display 116. A more detailed description of graphics adapter 108 is disclosed in FIG. 2.

South bridge 107 may provide a connection for a keyboard and mouse adapter 110, modem 111 and additional memory 112. A keyboard 118 and a mouse 119 may be connected to keyboard and mouse adapter 110. SCSI host bus adapter 113 may provide a connection for disk drive 114, e.g., hard disk, and CD-ROM drive 115. Typical PCI local bus implementations may support three or four PCI expansion slots or add-in connectors.

Those of ordinary skill in the art will appreciate that the hardware in FIG. 1 may vary depending on the implementation. Other internal hardware or peripheral devices, such as flash ROM (or equivalent non-volatile memory) or optical disk drives and the like, may be used in addition to or in place of the hardware depicted in FIG. 1.

The depicted example in FIG. 1 and the above-described example are not meant to imply architectural limitations. For example, data processing unit 100 may be a notebook computer or hand held computer in addition to taking the form of a Personal Digital Assistant (PDA). Data processing unit 100 may also be a kiosk or a Web appliance.

It is noted that implementations of the invention include implementations as a computer system programmed to execute the method or methods described herein, and as a computer program product. According to the computer system implementations, sets of instructions for executing the method or methods may be resident in main memory 104 of one or more computer systems configured generally as described above. Until required by computer system 100, the set of instructions may be stored as a computer program product in another computer memory, for example, in disk unit 114. Furthermore, the computer program product can also be stored at another computer and transmitted when desired to the user's workstation by a network, e.g., LAN, or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
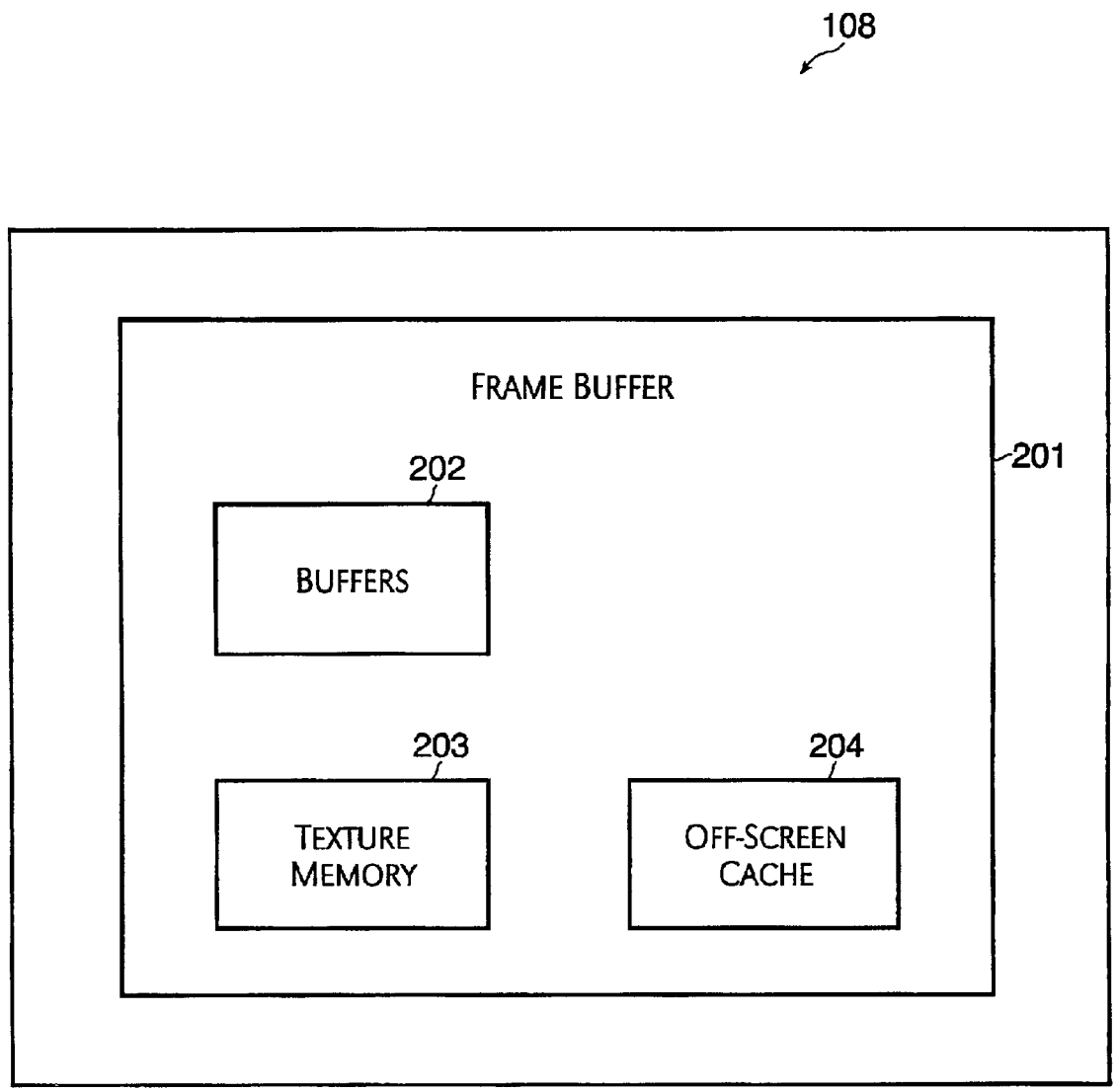
FIG. 2 illustrates an embodiment of the present invention of a graphics adapter in the data processing unit.

FIG. 2—Graphics Adapter

FIG. 2 illustrates an embodiment of the present invention of graphics adapter 108. As stated above, graphics adapter 108 may be configured to control the rendering of text and images on display 116. Graphics adapter 108 may comprise a frame buffer 201 configured to temporarily store one or more frames of data to be displayed on the user's display screen 116. Frame buffer 201 may allocate at least a portion of its memory space for buffers 202 configured to implement either double buffered stereo or single buffered stereo as discussed in further detail below. Frame buffer 201 may further allocate at least a portion of its memory space for texture memory 203 configured to store texture maps. As stated in the Background Information section, a texture map may refer to the two dimensional image that is mapped onto a surface of a three-dimensional object. Furthermore, frame buffer 201 may further allocate at least a portion of its memory space for off screen cache 204 configured to store an image that already has been rendered thereby permitting the display of that image at a later time without having to first render that image. By not having to first render the image, the image may be displayed at a faster rate.

As stated in the Background Information section, double buffered stereo may require four buffers where the buffers alternate for being used to render or display images. Typically, two buffers are alternatively used for displaying images; whereas, the other two buffers are alternatively used for displaying images. When the images are rendered, the two buffers that were used for rendering images become temporarily used for displaying images. When that occurs, the two buffers that were used for displaying images become temporarily used for rendering images. In one embodiment, one of the two buffers used for rendering/displaying an image may be used for rendering/displaying a right eye image. The other of the two buffers used for rendering/displaying an image may be used for rendering/displaying a left eye image. In contrast, single buffered stereo may require only two buffers instead of four buffers. In one embodiment, one of the two buffers may be used for rendering/displaying images for the right eye and the other of the two buffers may be used for rendering/displaying images for the left eye. By organizing the memory space of frame buffer 201 to perform single buffered stereo instead of double buffered stereo, i.e., buffers 202 comprise two buffers instead of four buffers for rendering/displaying images, frame buffer 201 may have more memory space to allocate for texture memory 203 and/or off-screen cache 204. It would therefore be desirable to provide the user of data processing unit 100 with an option to select single buffered stereo instead of double buffered stereo in a windowing system, e.g., X-window system, thereby permitting the extra memory space in frame buffer 201 to be allocated for texture memory 203 and/or off screen cache 204. Methods for providing the user of data processing unit 100 with an option to select single buffered stereo instead of double buffered stereo in a windowing system, e.g., X-window system, are described in FIGS. 4 and 5.

FIG. 3—X-Server

Figure 3:
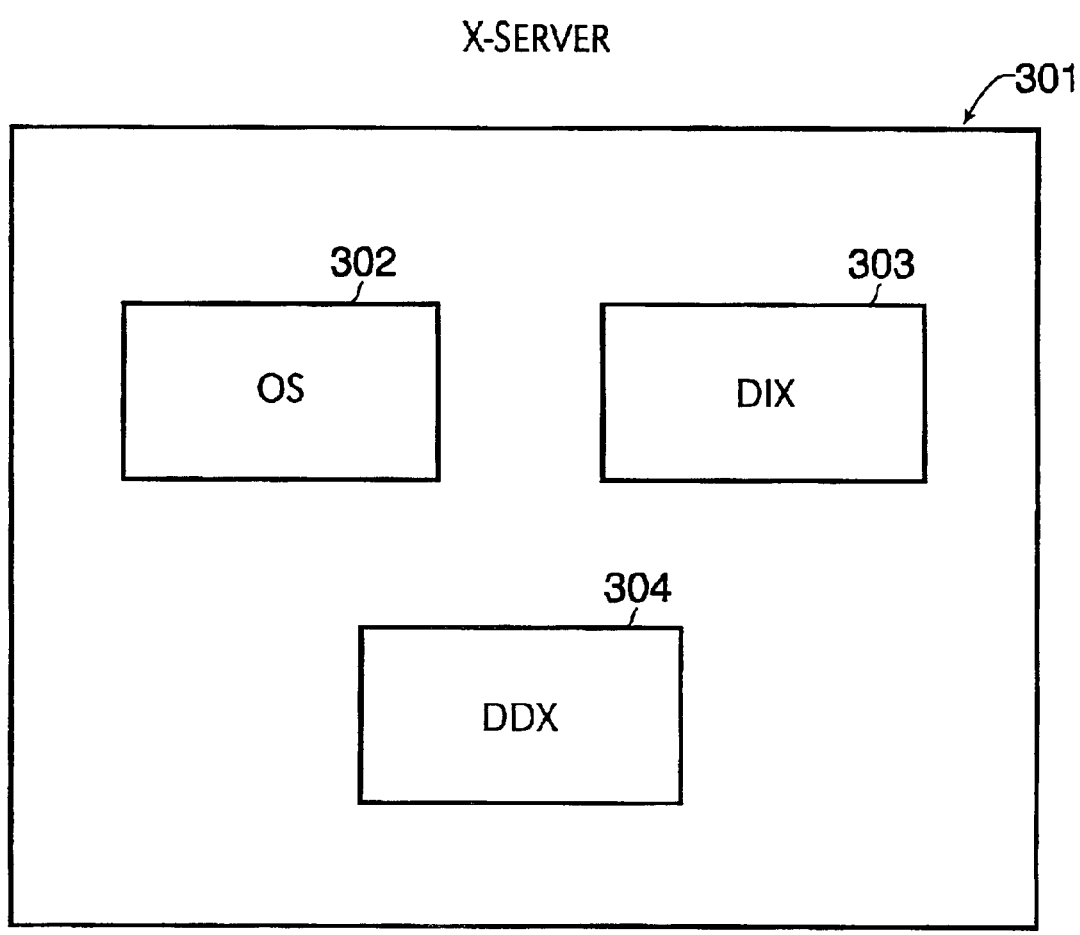
FIG. 3 illustrates an embodiment of the present invention of an X-server.

FIG. 3 illustrates an embodiment of the present invention of X-server 301. In a window system, e.g., X windows, a user of data processing system 100 may run applications on other computers in a network and view the output on their own screen 116. Typically, software, commonly referred to as X-client software, resides in the computer that performs the processing while software, commonly referred to as X-server software, resides in the computer that displays it. FIG. 3 illustrates X-Server 301 that may be configured to display the application that is running on a remote machine. It is noted though that both components, i.e., X-client software and X-server software, may reside on the same machine and that FIG. 3 is illustrative.

Referring to FIG. 3, X-Server 301 may comprise X-Server's Operating System layer (OS) 302. OS 302 may encapsulate the X-Server functions that vary with specific operating system features. OS 302 may manage data processing system 100 connections, read requests from data processing system 100, writes events and replies back to data processing system 100, manage connection authorization schemes, and provide memory allocation and deallocation routines. OS 302 may read the request from Xlib (not shown) residing in X client software (not shown) and send it to the Device-Independent layer (DIX) 303. Xlib (not shown) may be a C-language X-library that provides an interface to X window functions.

DIX 303 may comprise the parts of the X-Server 301 that are portable from one implementation to another, i.e., the parts that do not depend on graphics hardware or input devices. DIX 303 may interpret the requests from OS 302, manage event queues, distribute events to data processing system 100, manage the data structures visible to data processing system 100, and direct the other parts of the X-Server 30, including the Device Dependent layer (DDX) 304.

DDX 304 may encapsulate X-Server 301 functions that depend on the capabilities of particular graphics and input devices. DDX 304 may be configured to initialize and manipulate graphics adapter 108. For example, DDX 304 may be configured to allocate the memory space of frame buffer 201 such that buffers 202 in frame buffer 201 may be configured to implement either double buffered stereo or single buffered stereo. Furthermore, DDX 304 allocates the memory space of frame buffer 201 for texture memory 203 and off screen cache 204. In addition, DDX 304 may collect input events from keyboard 118 and mouse 119 and relay them back to DIX 303. If a requested function involves a graphics operation, DDX 304 reads/writes data to the frame buffer 201. In one embodiment, DDX 304 may be configured to draw a graphic image to frame buffer 201, after which, the graphics hardware reads the drawn image from frame buffer 201 and outputs the drawn image to display 116.

Figure 4:
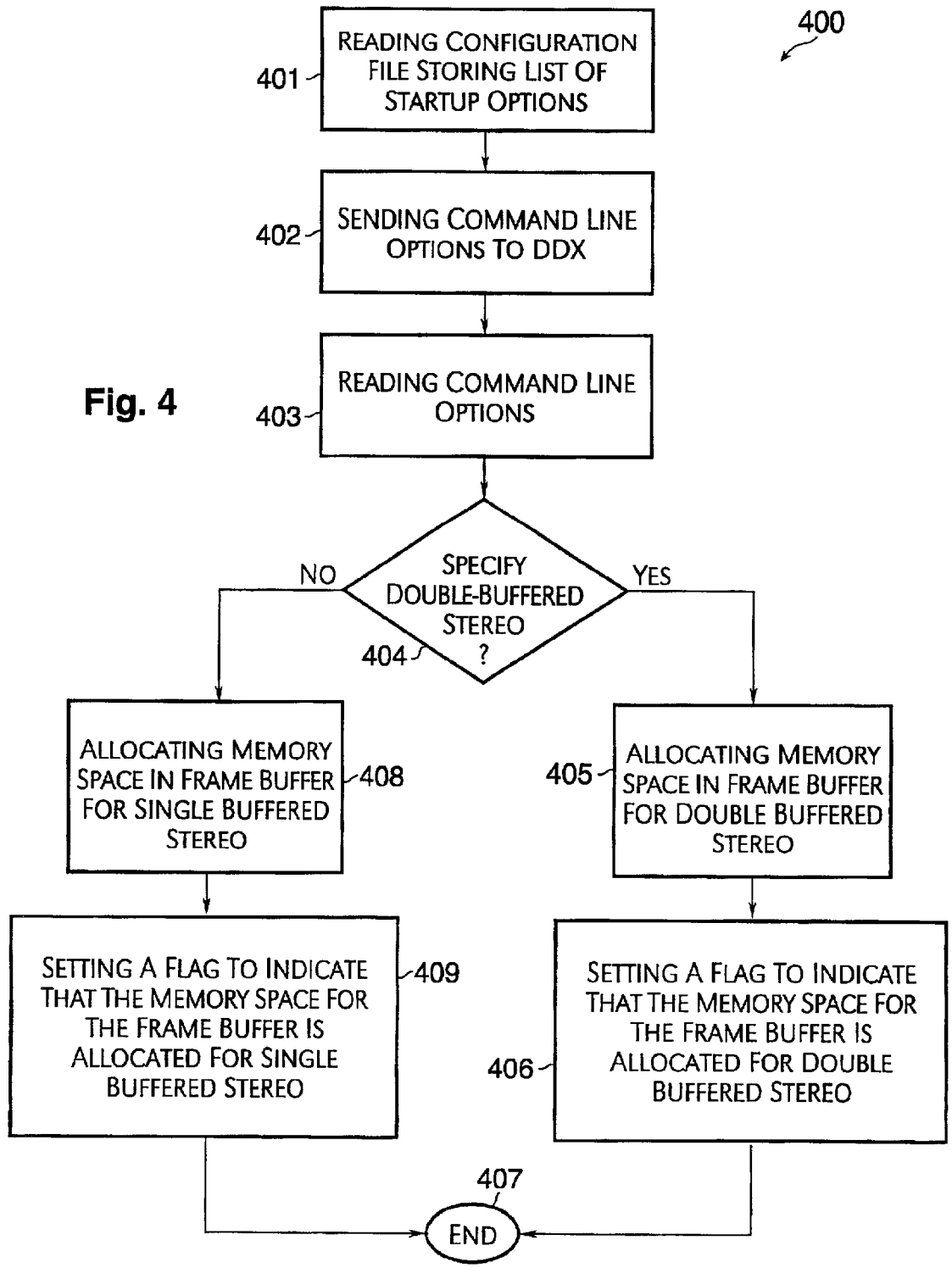
FIG. 4 is a flowchart of a method for allocating memory space in a frame buffer for either double buffered stereo or single buffered stereo.

FIG. 4—Method for Allocating Memory Space in a Frame Buffer for Either Double Buffered Stereo or Single Buffered Stereo FIG. 4 illustrates a method 400 according to an embodiment of the present invention. FIG. 4 is a method 400 for allocating the memory space in frame buffer 201 for either double buffered stereo or single buffered stereo in a windowing system, e.g., X-window system. By allocating memory space in frame buffer 201 for single buffered stereo, the frame buffer 201 may have more memory space to allocate for texture memory 203 and/or off-screen cache 204.

Referring to FIG. 4, in step 401, an X application, e.g., X init, DT login, Star X, may read a configuration file, e.g., xserverrc. The configuration file, e.g., xserverrc, may be configured to store a list of startup options commonly referred to as "extensions." These startup options may be used by DDX 304 to initialize and manipulate graphics adapter 108. These startup options may include what may be referred to as "command line options" that are options entered by the user in the configuration file. For example, the list of startup options may include the command line option of "-Stereo" which may be an option entered by the user in the configuration file. The command line option of "-Stereo" may be used to inform DDX 304 to allocate the memory space in frame buffer 201 for double buffered stereo. A user of data processing system 100 may modify the configuration file, e.g., xserverrc, to enter a command line option in any number of ways. For example, the user of data processing system 100 may simply edit the configuration file by inserting the option "-Stereo" among the list of startup options in the configuration file. It is noted that there are other ways of modifying the configuration file, e.g., xserverrc, to enter a command line option which would be apparent to those of ordinary skill and that the above example is not to be interpreted as inclusive of all the ways of modifying the configuration file, e.g., xserverrc. If the configuration file, e.g., xserverrc, does not include the command line option of "-Stereo" then DDX 304 may be informed to allocate the memory space in frame buffer 201 according to a default, e.g., single buffered stereo. That is, the configuration file may comprise a default value that indicates to DDX 304 to allocate the memory space in frame buffer 201 according to a default, e.g., single buffered stereo. The default value may be overridable by a particular command line option, e.g., "-Stereo."

In step 402, the X application may then send the command line options read, e.g., "-Stereo", to DDX 304. In step 403, DDX 304 may be configured to read the command line options sent to it by the X application in step 402. It is noted that a user of data processing unit 100 may instead of modifying the configuration file, e.g., xserverrc, enter a command line option, e.g., "-Stereo", on the command line. DDX 304 may then be configured to read the command line option entered by the user of data processing system 100 on the command line.

In step 404, a determination may be made by DDX 304 as to whether the command line options read in step 403 specifies allocating the memory space in frame buffer 201 for double buffered stereo. If the command line options indicate that DDX 304 is to allocate the memory space in frame buffer 201 for double buffered stereo then DDX 304 may allocate the memory space in frame buffer 201 for double buffered stereo in step 405. In one embodiment, the command line option may indicate to allocate the memory space in frame buffer 201 for double buffered stereo by the command line option "-Stereo." In one embodiment, DDX 304 may call a device driver to allocate the memory space in frame buffer 201 for double buffered stereo. As stated above, when DDX 304 allocates the memory space in frame buffer 201 for double buffered stereo, buffers 202 may comprise four buffers where the buffers alternate for being used to render or display images. Typically, two buffers are alternatively used for displaying images; whereas, the other two buffers are alternatively used for displaying images. When the images are rendered, the two buffers that were used for rendering images become temporarily used for displaying images. When that occurs, the two buffers that were used for displaying images become temporarily used for rendering images. In one embodiment, one of the two buffers used for rendering/displaying an image may be used for rendering/displaying a right eye image. The other of the two buffers used for rendering/displaying an image may be used for rendering/displaying a left eye image. When the memory space for frame buffer 201 is allocated for double buffered stereo there is less memory space for texture memory 203 and/or off-screen cache 204.

In step 406, DDX 304 may set a flag to indicate that the memory space for frame buffer 201 is allocated for double buffered stereo. The flag may indicate to DDX 304 that the memory space for frame buffer 201 has been allocated for double buffered stereo and that DDX 304 should continue to allocate the memory space for frame buffer 201 for double buffered stereo. Setting the flag may be advantageous as DDX 304 may not read the command line options upon the rendering of each image in buffers 202. Upon setting the flag to indicate that the memory space for frame buffer 201 is allocated for double buffered stereo method 400 terminates in step 407.

Referring to step 404, if the command line options did not indicate that DDX 304 is to allocate the memory space in frame buffer 201 for double buffered stereo then DDX 304 may allocate the memory space in frame buffer 201 according to a default, e.g., single buffered stereo, in step 408. That is, the default in allocating the memory space in frame buffer 201 may be to allocate the memory space in frame buffer 201 for single buffered stereo. In one embodiment, DDX 304 may call a device driver to allocate the memory space in frame buffer 201 for single buffered stereo. As stated above, when DDX 304 allocates the memory space in frame buffer 201 for single buffered stereo, buffers 202 may comprise two buffers instead of four buffers for double buffered stereo. In single buffered stereo, one of the two buffers may be used for rendering/displaying images for the right eye and the other of the two buffers may be used for rendering/displaying images for the left eye. By organizing the memory space of frame buffer 201 to perform single buffered stereo instead of double buffered stereo, i.e., buffers 202 comprise two buffers instead of four buffers for rendering/displaying images, frame buffer 201 may have more memory space to allocate for texture memory 203 and/or off-screen cache 204.

In step 409, DDX 304 may set a flag to indicate that the memory space for frame buffer 201 is allocated for single buffered stereo. The flag may indicate to DDX 304 that the memory space for frame buffer 201 has been allocated for single buffered stereo and that DDX 304 should continue to allocate the memory space for frame buffer 201 for single buffered stereo. Setting the flag may be advantageous as DDX 304 may not read the command line options upon the rendering of each image in buffers 202. Upon setting the flag to indicate that the memory space for frame buffer 201 is allocated for single buffered stereo method 400 terminates in step 407.

It is noted that steps 401–409 in method 400 may be executed in a different order than presented and that the order presented in the discussion of FIG. 4 is illustrative. It is further noted that certain steps in steps 401–409 may occur almost concurrently. It is further noted that DDX 304 in step 403 of method 400 may be configured to read the command line options to determine if the command line options specify allocating the memory space in frame buffer 201 for single buffered stereo instead of double buffered stereo. That is, the default in allocating the memory space in frame buffer 201 may be to allocate the memory space in frame buffer 201 for double buffered stereo. In one embodiment, the command line option may indicate to allocate the memory space in frame buffer 201 for single buffered stereo by the command line option "-Stereo." Furthermore, DDX 304 in steps 405–406 may be configured to allocate the memory space in frame buffer 201 for single buffered stereo and setting a flag indicating that memory space in frame buffer 201 has been allocated for single buffered stereo if the command line option indicated to allocate the memory space in frame buffer 201 for single buffered stereo. Furthermore, DDX 304 in steps 408–409 may be configured to allocate the memory space in frame buffer 201 for double buffered stereo and setting a flag indicating that memory space in frame buffer 201 has been allocated for double buffered stereo if the command line options did not indicate to allocate the memory space in frame buffer 201 for single buffered stereo.

Figure 5:
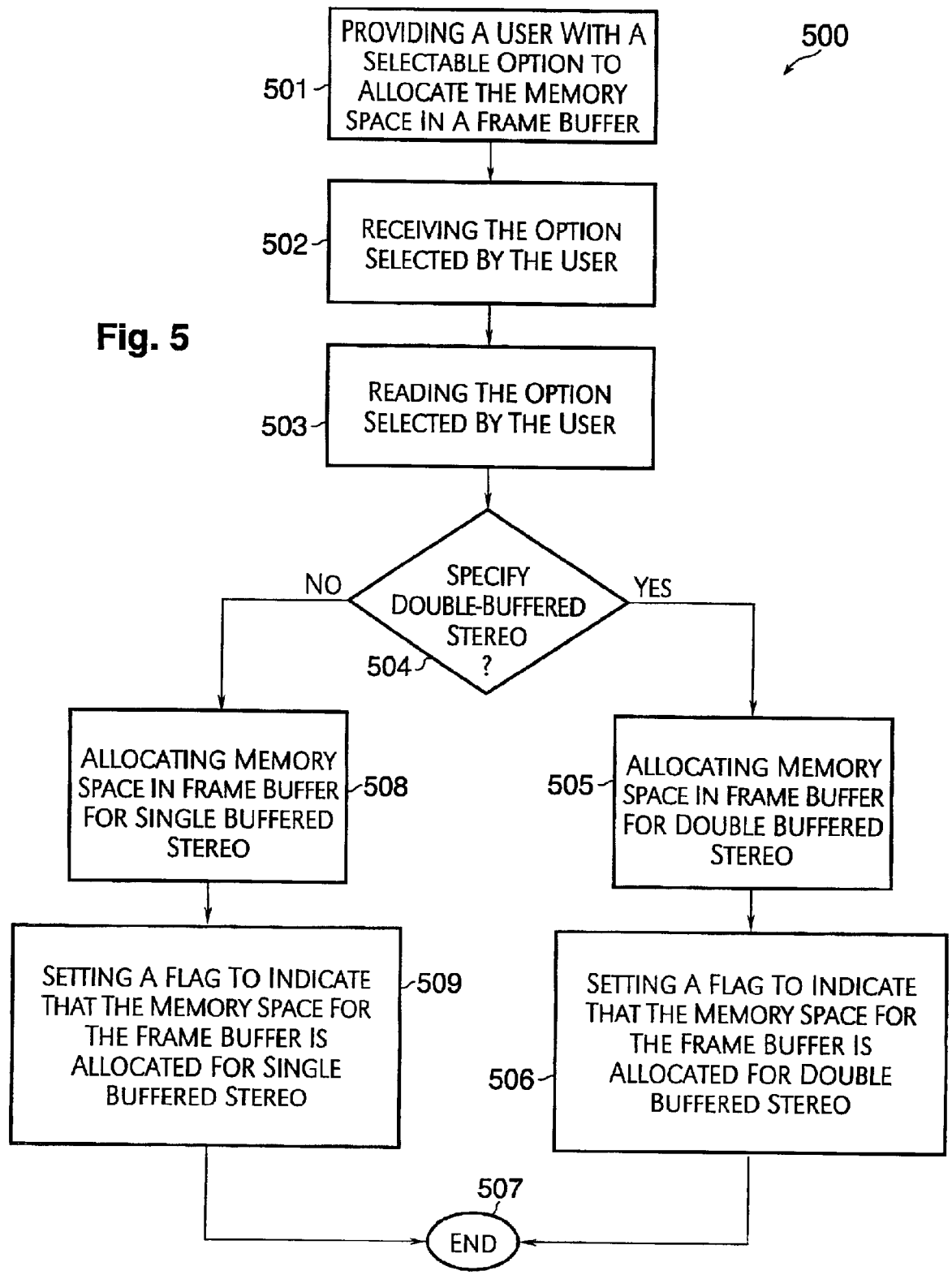
FIG. 5 is a flowchart of another method for allocating memory space in a frame buffer for either double buffered stereo or single buffered stereo.

FIG. 5—Another Method for Allocating Memory Space in a Frame Buffer for Either Double Buffered Stereo or Single Buffered Stereo FIG. 5 illustrates a method 500 according to an embodiment of the present invention. FIG. 5 is another method 500 for allocating the memory space in frame buffer 201 for either double buffered stereo or single buffered stereo in a windowing system, e.g., X-window system. By allocating memory space in frame buffer 201 for single buffered stereo, the frame buffer 201 may have more memory space to allocate for texture memory 203 and/or off-screen cache 204.

Referring to FIG. 5, in step 501, the user of data processing unit 100 may be provided with an option to select whether frame buffer 201 is to be configured for double buffered stereo or single buffered stereo in a windowing system, e.g., X-window system. For example, the user may be provided with a pop-up menu or a dialog box allowing the user to select between double buffered stereo or single buffered stereo. It is noted that there other means of providing the user of data processing unit 100 with an option to select whether frame buffer 201 is to be configured for double buffered stereo or single buffered stereo in a windowing system and that the above is illustrative.

In step 502, DDX 304 may be configured to receive the option selected by the user in step 501. In step 503, DDX 304 may be further configured to read the option selected in step 501.

In step 504, a determination may be made by DDX 304 as to whether the selected option read in step 503 specifies allocating the memory space in frame buffer 201 for double buffered stereo. If the selected option indicates that DDX 304 is to allocate the memory space in frame buffer 201 for double buffered stereo then DDX 304 may allocate the memory space in frame buffer 201 for double buffered stereo in step 505. In one embodiment, DDX 304 may call a device driver to allocate the memory space in frame buffer 201 for double buffered stereo. As stated above, when DDX 304 allocates the memory space in frame buffer 201 for double buffered stereo, buffers 202 may comprise four buffers where the buffers alternate for being used to render or display images. Typically, two buffers are alternatively used for displaying images; whereas, the other two buffers are alternatively used for displaying images. When the images are rendered, the two buffers that were used for rendering images become temporarily used for displaying images. When that occurs, the two buffers that were used for displaying images become temporarily used for rendering images. In one embodiment, one of the two buffers used for rendering/displaying an image may be used for rendering/displaying a right eye image. The other of the two buffers used for rendering/displaying an image may be used for rendering/displaying a left eye image. When the memory space for frame buffer 201 is allocated for double buffered stereo there is less memory space for texture memory 203 and/or off-screen cache 204.

In step 506, DDX 304 may set a flag to indicate that the memory space for frame buffer 201 is allocated for double buffered stereo. The flag may indicate to DDX 304 that the memory space for frame buffer 201 has been allocated for double buffered stereo and that DDX 304 should continue to allocate the memory space for frame buffer 201 for double buffered stereo. Setting the flag may be advantageous as DDX 304 may not read the selectable option upon the rendering of each image in buffers 202. Upon setting the flag to indicate that the memory space for frame buffer 201 is allocated for double buffered stereo method 500 terminates in step 507.

Referring to step 504, if the selected option read in step 503 indicates that DDX 304 is to allocate the memory space in frame buffer 201 for single buffered stereo then DDX 304 may allocate the memory space in frame buffer 201 for single buffered stereo in step 508. In one embodiment, DDX 304 may call a device driver to allocate the memory space in frame buffer 201 for single buffered stereo. As stated above, when DDX 304 allocates the memory space in frame buffer 201 for single buffered stereo, buffers 202 may comprise two buffers instead of four buffers for double buffered stereo. In single buffered stereo, one of the two buffers may be used for rendering/displaying images for the right eye and the other of the two buffers may be used for rendering/displaying images for the left eye. By organizing the memory space of frame buffer 201 to perform single buffered stereo instead of double buffered stereo, i.e., buffers 202 comprise two buffers instead of four buffers for rendering/displaying images, frame buffer 201 may have more memory space to allocate for texture memory 203 and/or off-screen cache 204.

In step 509, DDX 304 may set a flag to indicate that the memory space for frame buffer 201 is allocated for single buffered stereo. The flag may indicate to DDX 304 that the memory space for frame buffer 201 has been allocated for single buffered stereo and that DDX 304 should continue to allocate the memory space for frame buffer 201 for single buffered stereo. Setting the flag may be advantageous as DDX 304 may not read the selectable option upon the rendering of each image in buffers 202. Upon setting the flag to indicate that the memory space for frame buffer 201 is allocated for single buffered stereo method 500 terminates in step 507.

It is noted that steps 501–509 in method 500 may be executed in a different order than presented and that the order presented in the discussion of FIG. 5 is illustrative. It is further noted that certain steps in steps 501–509 may occur almost concurrently.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for allocating memory space comprising the steps of:

providing a user with a selectable option to allocate said memory space as a double buffered stereo or a single buffered stereo; and allocating said memory space as one of said double buffered stereo and said single buffered stereo in response to said selectable option.

2. The method as recited in claim 1, wherein if said memory space is allocated for said single buffered stereo then a greater portion of said memory space is available for at least one of texture memory and off-screen cache.

3. The method as recited in claim 1, wherein if said memory space is allocated for said single buffered stereo then the method further comprises the step of:

setting a flag to indicate that said memory space is allocated for said single buffered stereo.

4. The method as recited in claim 1, wherein if said memory space is allocated for said double buffered stereo then the method further comprises the step of:

setting a flag to indicate that said memory space is allocated for said double buffered stereo.

5. The method as recited in claim 1 further comprising the step of:

receiving said selectable option;

reading said selectable option; and determining whether to allocate said memory space as said double buffered stereo or said single buffered stereo in response to said reading step.

6. A computer program product having a computer readable medium having computer program logic recorded thereon for allocating memory space, comprising:

programming operable for providing a user with a selectable option to allocate said memory space as a double buffered stereo or a single buffered stereo; and programming operable for allocating said memory space as one of said double buffered stereo and said single buffered stereo in response to said selected option.

7. The computer program product as recited in claim 6, wherein if said memory space is allocated for said single buffered stereo then a greater portion of said memory space is available for at least one of texture memory and off-screen cache.

8. The computer program product as recited in claim 6, wherein if said memory space is allocated for said single buffered stereo then the computer program product further comprises:

programming operable for setting a flag to indicate that said memory space is allocated for said single buffered stereo.

9. The computer program product as recited in claim 6, wherein if said memory space is allocated for said double buffered stereo then the computer program product further comprises:

programming operable for setting a flag to indicate that said memory space is allocated for said double buffered stereo.

10. The computer program product as recited in claim 6 further comprises:

programming operable for receiving said selectable option;

programming operable for reading said selectable option; and programming operable for determining whether to allocate said memory space as said double buffered stereo or said single buffered stereo in response to said reading step.

11. A system, comprising:

a processor;

a memory unit coupled to said processor, wherein said memory unit is operable for storing a computer program operable for allocating memory space;

a display;

a graphics adapter coupled to said display, wherein said graphics adapter is configured to control the rendering of text and images on said display, wherein said graphics adapter comprises a frame buffer configured to temporarily store one or more frames of data to be displayed on said display; and a bus coupling the processor to said graphics adapter;

wherein the computer program is operable for performing the following programming steps:

providing a user with a selectable option to allocate said memory space as a double buffered stereo or a single buffered stereo; and allocating said memory space as one of said double buffered stereo and said single buffered stereo in response to said selected option.

12. The system as recited in claim 11, wherein if said memory space is allocated for said single buffered stereo then a greater portion of said memory space is available for at least one of texture memory and off-screen cache.

13. The system as recited in claim 11, wherein if said memory space is allocated for said single buffered stereo then the computer program is further operable to perform the programming step:

setting a flag to indicate that said memory space is allocated for said single buffered stereo.

14. The system as recited in claim 11, wherein if said memory space is allocated for said double buffered stereo then the computer program is further operable to perform the programming step:

setting a flag to indicate that said memory space is allocated for said double buffered stereo.

15. The system as recited in claim 11, wherein the computer program is further operable to perform the programming steps:

receiving said selectable option;

reading said selectable option; and determining whether to allocate said memory space as said double buffered stereo or said single buffered stereo in response to said reading step.

16. A method for allocating memory space comprising the steps of:

reading a command line option to determine allocation of a memory space;

determining whether to allocate said memory space as a double buffered stereo or a single buffered stereo in response to said reading step; and allocating said memory space as one of said double buffered stereo and said single buffered stereo in response to said determining step.

17. The method as recited in claim 16, wherein if said memory space is allocated for said single buffered stereo then a greater portion of said memory space is available for at least one of texture memory and off-screen cache.

18. The method as recited in claim 16 further comprising the step of:

reading a file storing a set of startup options, wherein one of said startup options comprises a default value overridable by said command line option.

19. The method as recited in claim 18, wherein said default value corresponds to allocating said memory space as said double buffered stereo.

20. The method as recited in claim 19, wherein said command line option has a value corresponding to allocating said memory space as said single buffered stereo.

21. The method as recited in claim 18, wherein said default value corresponds to allocating said memory space as said single buffered stereo.

22. The method as recited in claim 21, wherein said command line option has a value corresponding to allocating said memory space as said double buffered stereo.

23. A computer program product having a computer readable medium having computer program logic recorded thereon for allocating memory space, comprising:

programming operable for reading a command line option to determine allocation of a memory space;

programming operable for determining whether to allocate said memory space as a double buffered stereo or a single buffered stereo in response to said reading step; and programming operable for allocating said memory space as one of said double buffered stereo and said single buffered stereo in response to said determining step.

24. The computer program product as recited in claim 23, wherein if said memory space is allocated for said single buffered stereo then a greater portion of said memory space is available for at least one of texture memory and off-screen cache.

25. The computer program product as recited in claim 23 further comprises:

programming operable for reading a file storing a set of startup options, wherein one of said startup options comprises a default value overridable by said command line option.

26. The computer program product as recited in claim 25, wherein said default value corresponds to allocating said memory space as said double buffered stereo.

27. The computer program product as recited in claim 26, wherein said command line option has a value corresponding to allocating said memory space as said single buffered stereo.

28. The computer program product as recited in claim 25, wherein said default value corresponds to allocating said memory space as said single buffered stereo.

29. The computer program product as recited in claim 28, wherein said command line option has a value corresponding to allocating said memory space as said double buffered stereo.

30. A system, comprising:
   a processor;
   a memory unit coupled to said processor, wherein said memory unit is operable for storing a computer program operable for allocating memory space;
   a display;
   a graphics adapter coupled to said display, wherein said graphics adapter is configured to control the rendering of text and images on said display, wherein said graphics adapter comprises a frame buffer configured to temporarily store one or more frames of data to be displayed on said display; and
   a bus coupling the processor to said graphics adapter;
   wherein the computer program is operable for performing the following programming steps:
      reading a command line option to determine allocation of a memory space in said frame buffer;
      determining whether to allocate said memory space in said frame buffer as a double buffered stereo or a single buffered stereo in response to said reading step; and
      allocating said memory space in said frame buffer as one of said double buffered stereo and said single buffered stereo in response to said determining step.

31. The system as recited in claim 30, wherein if said memory space is allocated for said single buffered stereo then a greater portion of said memory space is available for at least one of texture memory and off-screen cache.

32. The system as recited in claim 30, wherein the computer program is further operable to perform the programming step:
   reading a file storing a list of startup options, wherein said file comprises a default value overridable by said command line option.

33. The system as recited in claim 32, wherein said default value corresponds to allocating memory space as said double buffered stereo.

34. The system as recited in claim 33, wherein said command line option has a value corresponding to allocating said memory space as said single buffered stereo.

35. The system as recited in claim 32, wherein said default value corresponds to allocating said memory space as said single buffered stereo.

36. The system as recited in claim 35, wherein said command line option has a value corresponding to allocating said memory space as said double buffered stereo.

* * * * *